Oct. 31, 1933.  W. T. BARNHILL  1,932,436
COUPLER
Filed Feb. 8, 1930
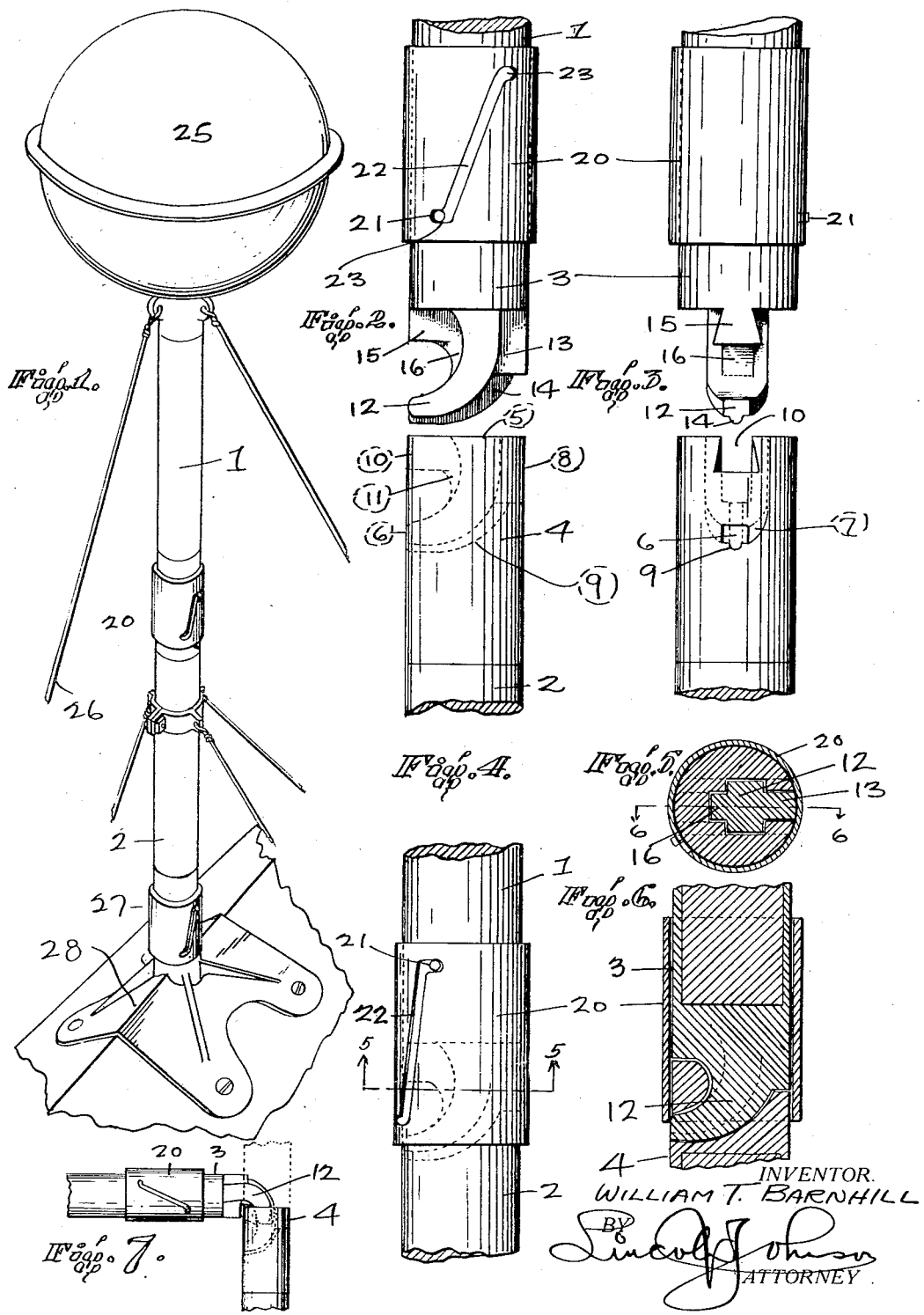

Patented Oct. 31, 1933

1,932,436

UNITED STATES PATENT OFFICE 1,932,436

COUPLER

William T. Barnhill, Portland, Oreg.

Application February 8, 1930. Serial No. 427,005

2 Claims. (Cl. 287—103)

This invention relates particularly to a coupler for holding in detachable engagement the abutting ends of poles, rods, rails or the like.

An object of the invention is to provide a coupler joint comprised of complementary parts to join together in axial relationship the abutting ends of poles, rods, rails or the like, to form a rigid joint which may be quickly and easily coupled together or taken apart.

A further object of the invention is to provide a connecting joint for joining together sectional poles, rods, rails or the like, and to hold said sections together in end to end alignment, whereby the assembled sections may be maintained in a substantially vertical position when in the assembled position, or the interlocked sections may be pulled or pushed in any angular direction without danger of the joints connecting the sections, becoming uncoupled or otherwise disarranged.

A still further object of the invention consists in providing a coupler joint to join the ends of sections of poles, rods, rails, or the like, wherein the coupler joint interlocks to hold the sections together with a sleeve which may be adjustably arranged to hold the sections fixedly connected by the joint, in co-extensive relation, the said sleeve being movable to permit uncoupling of the joint parts.

Other objects and advantages are to provide a coupler for joints that will be superior in point of simplicity, inexpensiveness of construction, positiveness of operation, and facility and convenience in use and general efficiency.

In the accompanying one sheet of drawing:

Fig. 1 represents a perspective view of a sectional radio pole having the sections thereof coupled together by a connecting joint constructed in accordance with my invention.

Fig. 2 is an enlarged side elevation of the connecting joint in the uncoupled position showing the construction of the male and female parts comprising the coupler.

Fig. 3 is a front elevation of Fig. 2.

Fig. 4 is a side elevation of the coupler joint in the interlocked position with the sleeve over the joint to hold the parts in co-extensive relation.

Fig. 5 is a cross section taken through Fig. 4 on the line 5—5.

Fig. 6 is a vertical section taken through Fig. 5 on the line 6—6.

Fig. 7 is a view showing the coupler parts in a right angle position to effect either a coupling or uncoupling of said parts.

In detail the construction illustrated in the drawing comprises the abutting ends 1 and 2 of adjacent sections of a pole, mast, rail, or the like, having attached thereon complementary coupler parts 3 and 4 to hold the ends of the said sections together in abutting axial alignment. The complementary parts 3 and 4 are indicated as being of circular cross section, although it is to be understood that the invention contemplates said parts might be of any other desired cross section. The outer ends of each of the parts 3 and 4 are suitably recessed or otherwise formed with sockets to receive therein, the ends of the poles 1 and 2, which may be fixedly secured therein to effect a permanent engagement between each coupler part and the pole to which it is secured.

The coupler part 4 is designated as the female half of the joint parts and is provided with a socket 5 therein, that extends from the outer end of the part in an inwardly and laterally curved direction and opens at its end 6 through the wall of the part 4. The side walls of the socket 5 are of a uniform width throughout except at the extreme bottom end of the socket adjacent the opening 6, wherein the sides of the said socket converge together slightly, as is indicated at 7. The opening 6 is provided through the said side of the part or member 4, to permit dirt and the like to be forced through and from the socket when the male part 3 of the joint is being interlocked therewith.

A slot 8 is cut through the outer end wall of the member 4 to provide an opening therethrough that communicates with the socket 5. The width of the slot 8 is less than that of the socket 5 and the side walls of the slot 8 are parallel to the side walls of the socket 5. A groove 9 is cut in the part 4, said groove 9 following the contour of the base of the socket 5. A slot 10 is cut through the wall of the member 4 at the end thereof at a point diametrically opposite the slot 8. The side walls of the slot or notch 10 are slightly diverged in dovetailed form. A portion of the socket 5 is cut away at 11 to communicate with the rear end of the slot 8.

The male half of the coupler is provided at its end with a projecting tongue 12 that is curved laterally and radially to complement the socket 5 in the part 4. The tongue 12 is adapted to interlock within the socket 5 wherein the male and female parts 3 and 4 will be arranged in end to end abutment and in co-extensive axial alignment. A lug 13 is formed integrally on one side of the tongue 12 to seat within the groove 9 provided in the part 4. A rib 14 is provided to reinforce the tongue 12 and to effect a proper seating engagement between the parts 3 and 4 when interlocked together. A lug 15 is provided on the under side of the tongue 12, said lug being of dovetail form, to fit within the dovetail notch 10 of the part 4. A reinforcing rib 16 on the lug 15 is adapted to fit within the cut out portion 11 in the member 4.

The complementary parts of the joint are assembled by being placed in substantially right angular position shown in Fig. 7, whereby the dovetail lug 15 registers with the slot 10 and the tapered end portion of the tongue 12 projects into the socket 5. The parts are then swung into axial alignment so that as the curved tongue 12 moves into the curved socket 5 and as the tongue advances into the socket, the rib 14 advances into the groove 9 and the lug 13 moves into the notch 8. While the parts are held in axial alignment they cannot be disconnected by axial movement because of the connection effected by the dovetailed lug 15 in the notch 10. I have found that the complementary parts of the joint may even swing ten or fifteen degrees out of axial alignment and the coupling parts will still hold together. The joint assembly will thus hold together to permit any desired directional movement of the sectional parts 1 and 2 coupled together by the joint.

In cases where it is desirable to maintain the connected joint in rigid co-extensive relation, I provide a locking sleeve 20 that is revolvably fitted about the part 3, and which is permitted an axial movement by a pin 21 working in a bayonet slot 22 in the sleeve 20. The sleeve 20 has the slot 23 arranged angularly lengthwise thereof, and the ends of the said slot each terminate in an enlarged recess 23. The sleeve 20 is slidable axially on the member 3 to clear the abutting ends of the parts 3 and 4 so that by sliding the sleeve 20 lengthwise on the part 3 and engaging one end of the slot 22 in said sleeve with the pin 21, it is possible to hold said sleeve in an out of the way position until such time as it is desirable to slide it over the coupled joint.

When the joint is coupled together in the manner shown in Fig. 4, the sleeve extends an equal distance on both sides of the joint, and the sleeve 20 is moved until the opposite end of the slot 22 therein engages the pin 21, to thus hold the said sleeve over the coupled parts in axial co-extensive relation. The angularity of the slot 22 in the sleeve 20 is such that it cannot move axially in either direction except through manual movement, and there will be no tendency of the sleeve to unloosen or turn backward by itself to permit the joint parts to uncouple. In order to disconnect the separable parts of the joint, the sleeve would be moved from its covering position over the joint, and the parts 3 and 4 turned to the angular position required for disconnection.

In Fig. 1, I have indicated the application of the joint to the sections 1 and 2 of a radio pole. The upper end of the section 1 is provided with a suitable antenna 25 and both of the parts 1 and 2 of the pole are arranged with guy wire coupling devices thereon. The bottom section 2 of the pole is provided with a coupling joint 27 thereon, to match with a complementary coupling part on the pole 2. Aside from this use as a joint for coupling together the sections of aerial poles, the coupler may be also adapted to other uses where sectional parts are required, and it is readily apparent that it may be made in sizes required for any of the particular uses for which it may be put.

Having thus described this invention, what I claim and desire to secure by Letters Patent is:

1. A connection of the character described comprising two complemental parts adapted to be brought into end to end abutment, one of said parts having a socket opening to the end thereof and curved downwardly and through the side and having a notch at the end of the part at one side of the socket that is dovetailed radially and in the axial direction of the part, and having a notch at the other side of the socket; the other part having a curved tongue at its end disposed in the socket and a lug dovetailed radially and in the axial direction of the other part and disposed below the tongue in the dovetailed notch and having a lug above the tongue disposed in the notch on said other side of the socket.

2. A connection of the character described comprising two complemental parts adapted to be brought into end to end abutment, one of said parts having a socket opening to the end thereof and curved downwardly and through the side a portion of said socket being grooved on one side thereof to form a rib receiving recess and having a notch at the end of the part at one side of the socket that is dovetailed radially and in the axial direction of the part, and having a notch at the other side of the socket; the other part having a curved tongue at its end disposed in the socket and a lug dovetailed radially and in the axial direction of the other part and disposed below the tongue in the dovetailed notch and having a lug above the tongue disposed in the notch on said other side of the socket; and a rib to reinforce the outer side of the tongue on said last mentioned part of the joint.

WILLIAM T. BARNHILL.